(12) United States Patent
Fujii et al.

(10) Patent No.: US 11,295,039 B2
(45) Date of Patent: Apr. 5, 2022

(54) SUPPORT SYSTEM AND METHOD

(71) Applicant: KABUSHIKI KAISHA TOSHIBA, Tokyo (JP)

(72) Inventors: Hiroko Fujii, Tokyo (JP); Hirokazu Suzuki, Tokyo (JP); Masayuki Okamoto, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 204 days.

(21) Appl. No.: 15/693,473

(22) Filed: Sep. 1, 2017

(65) Prior Publication Data
US 2018/0260495 A1 Sep. 13, 2018

(30) Foreign Application Priority Data

Mar. 9, 2017 (JP) .............................. JP2017-045038

(51) Int. Cl.
| | | |
|---|---|---|
| *G06F 17/50* | (2006.01) | |
| *G06F 30/00* | (2020.01) | |
| G06F 30/13 | (2020.01) | |
| G06F 119/06 | (2020.01) | |

(52) U.S. Cl.
CPC .............. *G06F 30/00* (2020.01); *G06F 30/13* (2020.01); *G06F 2119/06* (2020.01); Y02E 60/00 (2013.01); Y04S 40/20 (2013.01)

(58) Field of Classification Search
CPC ....................................................... G06F 17/50
USPC ....................................................... 703/1, 18
See application file for complete search history.

(56) References Cited

U.S. PATENT DOCUMENTS

| | | | |
|---|---|---|---|
| 2003/0167150 A1* | 9/2003 | Shimura ................ | G06Q 10/10 702/182 |
| 2007/0234781 A1* | 10/2007 | Yamada .................. | F23N 3/002 73/23.2 |
| 2011/0054965 A1* | 3/2011 | Katagiri ............... | G06Q 10/063 705/7.11 |

(Continued)

FOREIGN PATENT DOCUMENTS

| | | |
|---|---|---|
| JP | 09-073459 | 3/1997 |
| JP | 08/221437 | 6/1998 |

(Continued)

*Primary Examiner* — Andre Pierre Louis
(74) *Attorney, Agent, or Firm* — Finnegan, Henderson, Farabow, Garrett & Dunner L.L.P.

(57) ABSTRACT

According to an embodiment, a design support system supports determination of a first design specification of a plant, the system including a memory and a hardware processor. The memory stores therein second design specifications of existing plants in association with first information related to a document(s) concerned with an existing plant. The hardware processor acquires a required specification which includes a part of elements of the first design specification and which indicates value of each element to be satisfied; identifies, based on second information in which an element(s) is/are associated with each condition, an element associated with a condition that matches the required specification; identifies a second design specification corresponding to the required specification based on the element identified; selects an element(s); and extracts, from the first information associated with the second design specification identified, a description related to the element selected.

9 Claims, 11 Drawing Sheets

(56) References Cited

U.S. PATENT DOCUMENTS

| | | | |
|---|---|---|---|
| 2012/0005103 A1 | 1/2012 | Seki et al. | |
| 2016/0069624 A1* | 3/2016 | Rollins | F04D 25/028 |
| | | | 415/122.1 |
| 2016/0292275 A1* | 10/2016 | Talton | G06F 17/2247 |
| 2019/0121920 A1* | 4/2019 | Park | G06F 17/5004 |

FOREIGN PATENT DOCUMENTS

| | | |
|---|---|---|
| JP | 2009-003543 | 1/2009 |
| JP | 2012-014309 | 1/2012 |
| JP | 2014-134920 | 7/2014 |
| WO | WO 2016/132774 | 8/2016 |

\* cited by examiner

| PLANT NAME | OUTPUT (10,000 kW) | FUEL | HEAT RESISTANT TEMPERATURE (°C) | TURBINE METHOD |
|---|---|---|---|---|
| D | 40 ↑ | COAL | 1300 | STEAM |

Columns OUTPUT, FUEL, HEAT RESISTANT TEMPERATURE, TURBINE METHOD are ELEMENTS. The row values are ELEMENT VALUE.

FIG.6

| CONDITION | ELEMENTS |
|---|---|
| (DEFAULT) | OUTPUT, MAXIMUM OUTPUT, POWER GENERATION PLANT TYPE |
| TURBINE | OUTPUT, TURBINE METHOD |
| WATERWHEEL | OUTPUT, WATERWHEEL TYPE |
| ⋮ | |

FIG. 7

| PLANT NAME | OUTPUT (10,000 kW) | FUEL | HEAT RESISTANT TEMPERATURE (°C) | TURBINE METHOD | TURBINE CONFIGURATION | CONDENSER VACUUM DEGREE (kPa) | PIPING (NUMBER OF PIPES) | CV OUTER DIAMETER (mm) | MSV (NUMBER OF VALVES) |
|---|---|---|---|---|---|---|---|---|---|
| A | 60 | COAL | 1100 | STEAM | TANDEM | 95 | Z | X | Y |
| B | 50 | COAL | 1500 | STEAM | CROSS | 98 | Z | X | Y |
| C | 25 | LNG | 1100 | GAS | - | - | Z | X | Y |

ELEMENTS

ELEMENT VALUES

FIG.8

| TARGET PLANT | REVIEW DATE | REVIEW CONTENT | REVIEW RESULT |
|---|---|---|---|
| A | 2018/10/05 | ABOUT TURBINE PIPING | Z PIPES ARE DETERMINED TO BE USED BASED ON COMPANY RULES |
| A | 2018/10/05 | ABOUT TYPE OF CONDENSER | TYPE OF CONDENSER IS DETERMINED TO BE SURFACE CONDENSATE TYPE |
| B | 2018/11/12 | ... | ... |

| TARGET PLANT | GENERATED PHENOMENON (TROUBLE) | CAUSE | COUNTER MEASURE | DATE OF OCCURRENCE | COUNTER-MEASURE COMPLETION DATE |
|---|---|---|---|---|---|
| A | STEAM LEAKAGE FROM CV | XXXX | XXXX | 2001/02/10 | 2001/06/20 |
| B | RISE OF EXHAUST GAS TEMPERATURE | LOSS OF VACUUM IN CONDENSER | YYYY | 2000/10/02 | 2000/12/12 |
| B | HEAT RESISTANT TEMPERATURE CONDITION IS NOT SATISFIED | CONDITION ERROR MADE DURING SIMULATION | ZZZ | 1998/07/08 | 1998/07/20 |

SUPPORT SYSTEM AND METHOD

CROSS-REFERENCE TO RELATED APPLICATIONS

This application is based upon and claims the benefit of priority from Japanese Patent Application No. 2017-045038, filed on Mar. 9, 2017; the entire contents of which are incorporated herein by reference.

FIELD

Embodiments described herein relate generally to a design support system and a design support method.

BACKGROUND

When newly designing a power generation plant such as, for example, a thermal power station, a hydroelectric power station, and a nuclear power station, a designer needs to comprehend various trouble cases, such as a dimensional error, material error, and damage of components, that have occurred in existing power generation plants, and countermeasures thereof in order not to repeat the same trouble. In recent years, a system is introduced which contains a database of review meeting records showing review contents and review results in design stages in the past, as well as records of unsuitable case examples, where a cause and its countermeasure for each trouble are recorded. With the system, a designer can refer to the review meeting records and the unsuitable case examples regardless of his or her own experience. When a designer searches a case example database for a case example, normally, the designer can make a search keyword by selecting a part of specification (component names and the like) of components included in a power generation plant to be designed and conditions to be satisfied by the design for each of a plurality of elements included in the power generation plant such as types of power generation plant such as thermal, hydroelectric, and nuclear power plants, maximum output, power generator rotational speed, and power generation method.

In this case, a large number of review meeting records and records of unsuitable case examples which include keywords are output ted as a search result. However, there is a problem that, in particular, younger designers with less experience cannot determine noteworthy information from among the search result. It is considered as an index to narrow down the search result that review meeting records or unsuitable case examples of a plant whose design is similar to that of a plant to be designed are used as target information in the search. In order to do this, it is necessary to determine similarity between the plant to be designed and an existing plant. As a method for determining such similarity, a method is known which determines similarity between design 3D model data of an existing plant and design 3D model data of a new plant from similarity of installation positions of equipment or piping.

DETAILED DESCRIPTION

According to an embodiment, a design support system supports determination of a first design specification of a plant, the first design specification indicating a first value of each of a plurality of elements that are used for the plant. The system includes a memory configured to store therein, a second design specification of each of a plurality of existing plants in association with first information, the first information being information related to at least one document concerned with any of the existing plants; and a hardware processor electrically coupled to the memory. The hardware processor is configured to: acquire a required specification which includes at least a part of the plurality of elements included in a design of the plant and which indicates a second value of each element to be satisfied in the design of the plant; identify, based on second information in which one or more elements are associated with each of a plurality of conditions, an element of the one or more elements in the second information chat is associated with a condition that matches the required specification;
identify a second design specification of an existing plant corresponding to the required specification based on the element identified; select at least one element; and extract, from the first information associated with the second design specification identified, a description related to the element selected.

Hereinafter, embodiments of a design support system and a design support method will be described in detail with reference to the drawings.

First Embodiment

Figure 1:
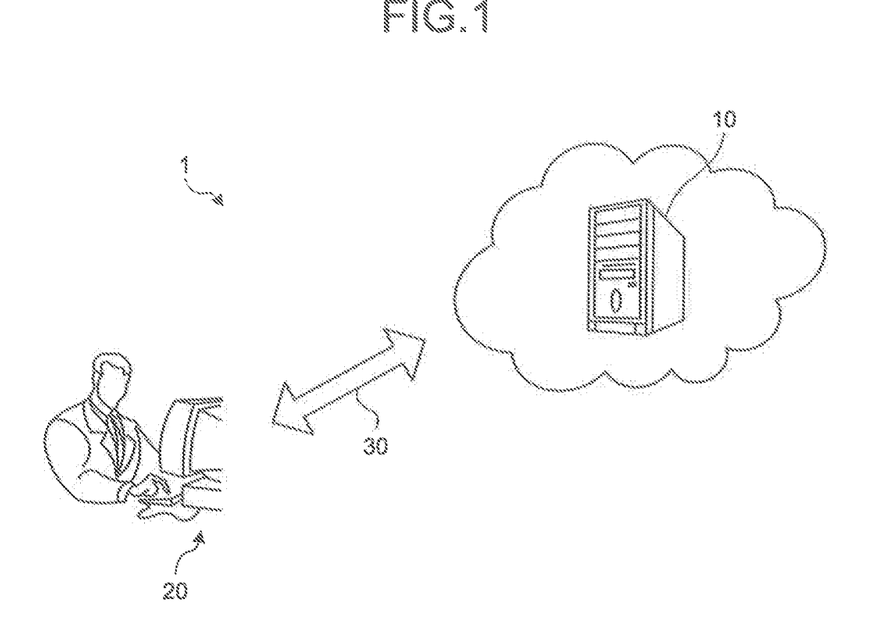
FIG. 1 is a diagram illustrating a configuration of a design support system of a first embodiment.

FIG. 1 is a diagram illustrating an example of a configuration of a design support system 1 of a present embodiment. As illustrated in FIG. 1, the design support system 1 includes a server 10 for providing a design support function and a terminal 20 used by a user, which are connected to each other through a network 30 such as the Internet. In this example, the design support function provided by the server 10 is provided to the terminal 20 by a web application. The user can use the design support function provided by the server 10 by using a web browser installed in the terminal 20.

Figure 2:
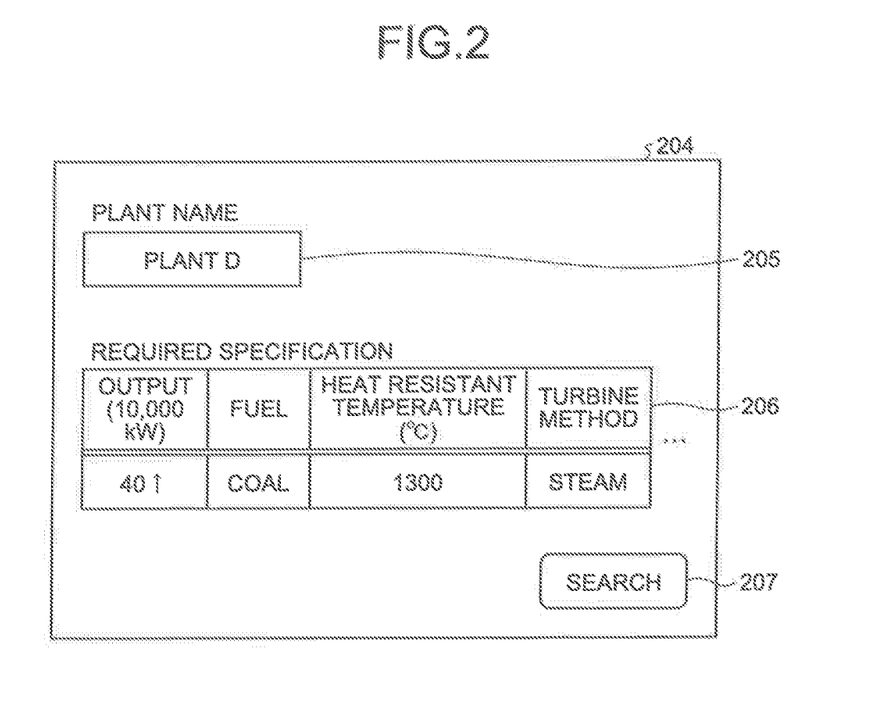
FIG. 2 is a diagram illustrating an input interface screen of the first embodiment.
Figure 3:
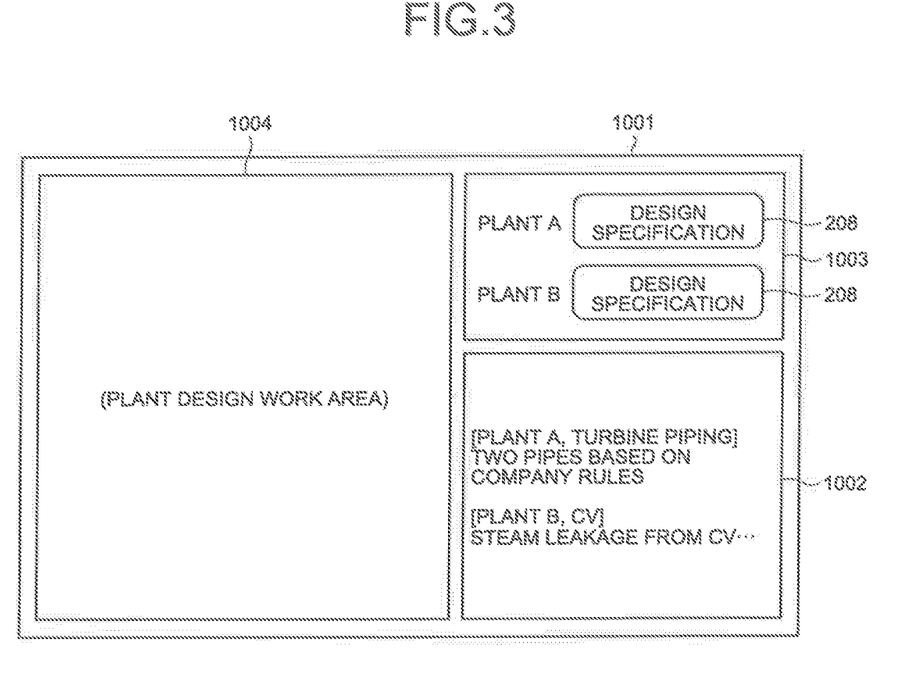
FIG. 3 is a diagram illustrating a screen example of the first embodiment.

FIG. 2 is an example of an input interface screen 204 displayed on the web browser when the user accesses the server 10 by using the web browser of the terminal 20. Displayed on the input interface screen 204 are areas into which the user inputs information related to a new power generation plant which the user intends to design (a plant name input area 205 into which a plant name is inputted and a required specification input area 206 into which a required specification of the plant which the user inputs into the plant name input area 205 are inputted). When the user inputs the information into these areas and then presses a search button 207, a screen 1001 as illustrated in FIG. 3 is displayed. The screen 1001, as illustrated in FIG. 3, includes a plant design work area 1004 corresponding to the information which the user inputs into each of the plant name input area 205 and the required specification input area 206, a reference plant display area 1003 in which existing plants (reference plants) determined to be used as references when designing the plant inputted into the plans name input area 205 and buttons 208 for each calling a design specification of the existing plant are arranged, and a reference information display area 1002 in which information extracted from document information (which may be referred to as an "evidence document") related to a corresponding existing plant is displayed.

Here, the design specification is information that indicates an element value of each of a plurality of elements (element items) used for constituting a plant. For example, a design specification of a power generation plant is information that indicates an element value corresponding to each of a plurality of elements (element items) such as maximum output, fuel, heat resistant temperature, specification of turbine (turbine method and turbine configuration), type of power generation plant, power generator rotational speed, power generation method (for example, in the case of a thermal power generation, method such as steam power generation, gas power generation, or combined power generation), and specification (size, number, and the like) of each component (steam condenser, piping, or the like) included in the power generation plant. The required specification is information which includes at least a part of a plurality of elements included in the design specification and indicates an element value (condition value) of each element to be satisfied in the design. Further, the evidence document (document information) is a document that includes at least one of a review meeting record which shows review contents and review results in a past design and an unsuitable case example which shows a cause and a countermeasure for each trouble.

Figure 4:
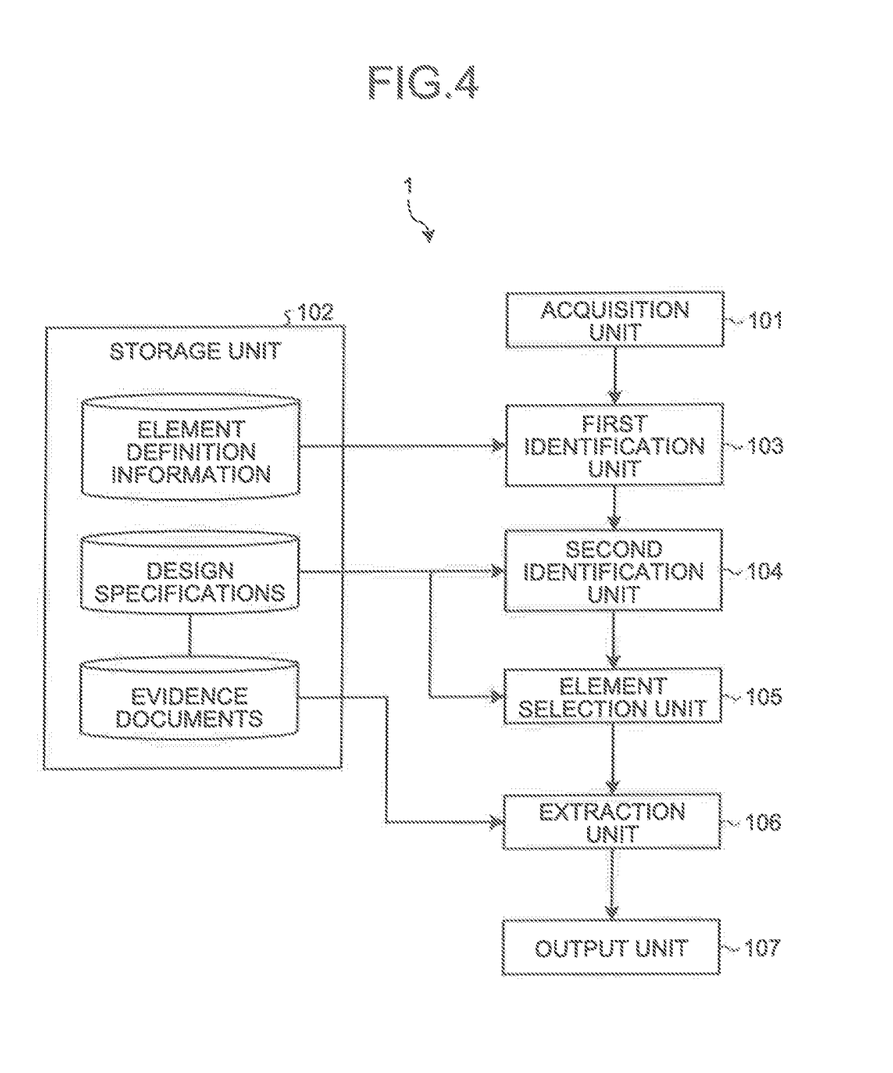
FIG. 4 is a diagram illustrating functions of the design support system of the first embodiment.

FIG. 4 is a diagram illustrating an example of functions of the design support system 1 of the present embodiment. As illustrated in FIG. 4, the design support system 1 has an acquisition unit 101, a storage unit 102, a first identification unit 103, a second identification unit 104, an element selection unit 105, an extraction unit 106, and an output unit 107.

In this example, functions of the acquisition unit 101, the first identification unit 103, the second identification unit 104, the element selection unit 105, the extraction unit 106, and the output unit 107 are provided by a web application (i.e. are implemented when the terminal 20 executes the web application) and the storage unit 102 is provided in the server 10. However, the above configuration may be changed. For example, the functions illustrated in FIG. 4 may be arbitrarily distributed to the server 10 and the terminal 20, or the functions illustrated in FIG. 4 may be installed in a single device (a standalone device). In the example of FIG. 4, the storage unit 102 stores therein element definition information, design specifications, and evidence documents, which will be described later. The evidence documents are respectively associated with design specifications of a plurality of existing plants and stored in the storage unit 102. In short, the storage unit 102 stores therein a design specification of each of a plurality of existing plants in association with an evidence document (document information) related to the existing plant. Specific content of the above information will be described later.

The acquisition unit 101 acquires a required specification. In this example, the acquisition unit 101 acquires the required specification by receiving an input of the required specification from a user (designer). Alternatively, for example, the user (designer) may register a required specification of a plant to be newly designed (design target plant) in the storage unit 102 in advance. In this case, the user inputs, for example, an identifier associated with the required specification instead of inputting the required specification. The acquisition unit 101 may read and acquire the required specification associated with the identifier inputted by the user from the storage unit 102.

Figure 5:
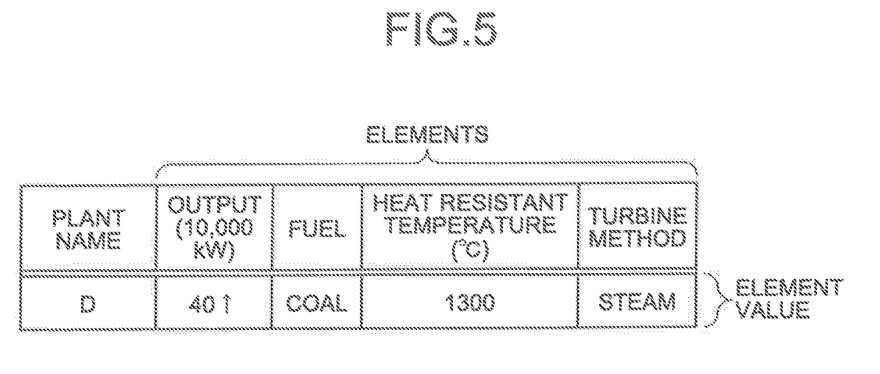
FIG. 5 is a diagram illustrating a required specification of the first embodiment.

FIG. 5 is a diagram illustrating an example of a required specification. FIG. 5 illustrates a required specification corresponding to a plant name of a new plant (plant to be designed). The required specification illustrated in FIG. 5 is represented in a table form and an element value to be satisfied in the design is written for each of a plurality of elements. The element values in this case may be values each indicating an allowable range. For example, an element value corresponding to an element "output" in the required specification illustrated in FIG. 5 is written as "40↑", This indicates a condition that the output is 400,000 kW or more. Not only numerical conditions, but also a plurality of allowable methods such as, for example, "steam or combined" for "turbine method" may be written. Here, the description "steam, or combined" corresponding to the element "turbine method" and information "coal," corresponding to the element "fuel" (that is, information indicating content of an element item) are also included in a concept of "element value to be satisfied in the design".

Figure 6:
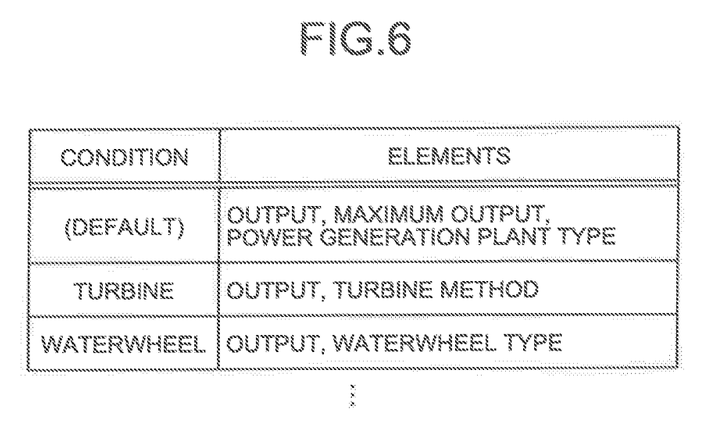
FIG. 6 is a diagram illustrating element definition information of the first embodiment.

Returning to FIG. 4 to continue the description, the first identification unit 103 identifies an element associated with a condition that matches the required specification based on element definition information in which one or more elements are associated with each of a plurality of conditions. FIG. 6 is a diagram illustrating an example of the element definition information. As illustrated in FIG. 6, the element definition information is information in which elements are associated with each of a plurality of conditions. As described later, when comparing a required specification with design specifications to select an existing plant similar to a design of a new plant, it is difficult to find an existing plant where all elements are matched because the number of elements is large in both, the required specification and the design specifications. On the ether hand, normally, as the design of a power generation plant is performed for each component, elements to be focused during design can be limited for each component. Further, among elements required in a component to be designed in the required specification, there are elements that must satisfy a condition and elements where the condition can be changed. In the element definition information in FIG. 6, a component name of a component to be designed is written in the "condition", and elements to be used to compare with the design specifications among elements of the required specification for a corresponding component are written in the "element". In the "element" of the element definition information, elements that are not included in the acquired required specification may be included. Of course, it is possible to define only one kind of "element" that is common to all designs.

For example, a case is assumed where the element definition information has a form illustrated in FIG. 6 and the required specification illustrated in FIG. 5 is acquired by the acquisition unit 101. The required specification illustrated in FIG. 5 includes an element "turbine method", so that it can be determined that components to be designed include a turbine. In this case, the condition "turbine" in the element definition information is satisfied. Therefore, the first identification unit 103 can identify the element "output" and the element "turbine method" which are associated with the condition "turbine" in the element definition information. Meanwhile, in this example, if "turbine" and "waterwheel" are not included as components to be designed, it is possible to identify the element "output", the element "maximum, output", and the element "power generation plant type" associated with the condition "default" from element specifications.

Figure 7:
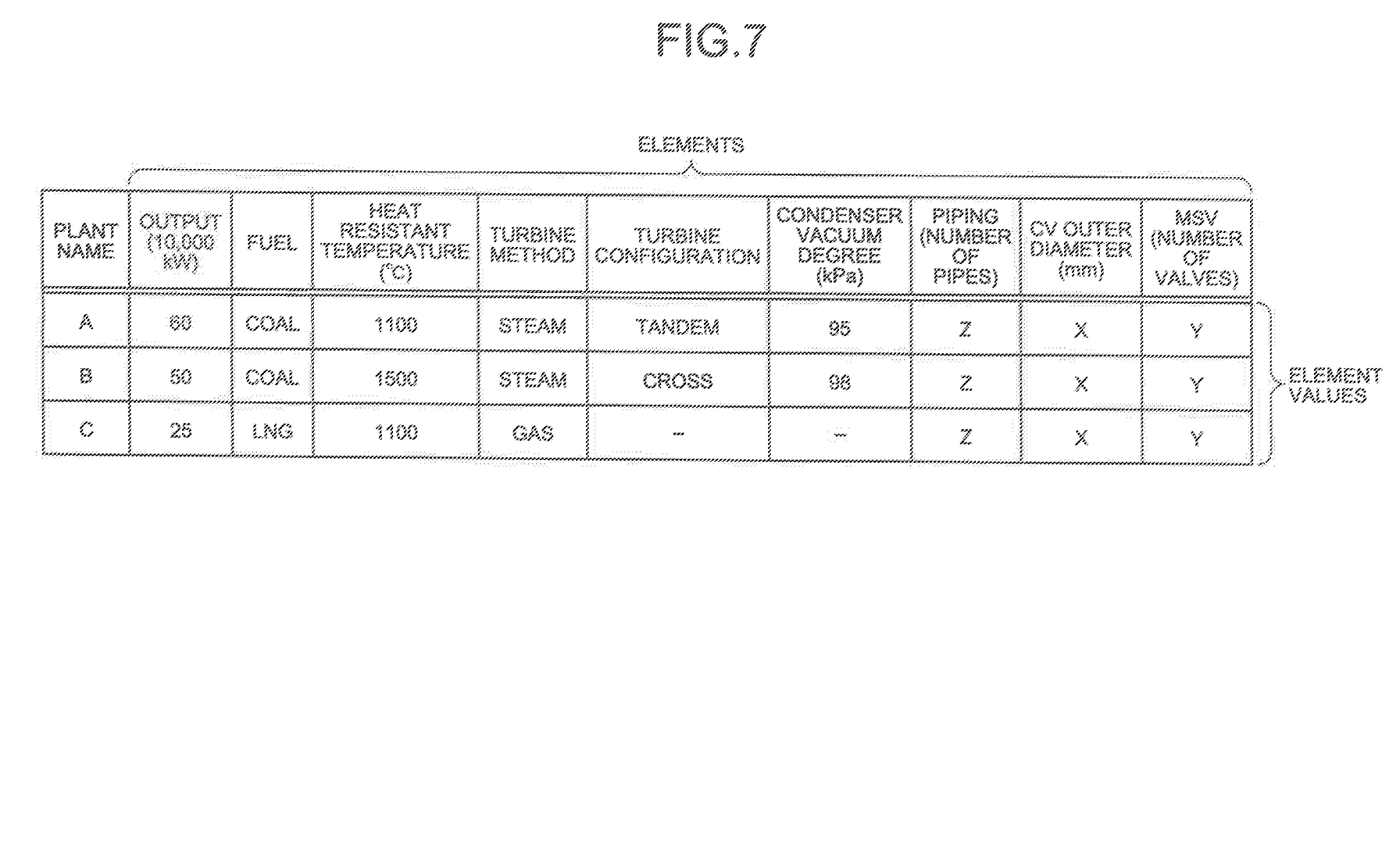
FIG. 7 is a diagram illustrating design specifications of the first embodiment.

Returning to FIG. 4 to continue the description, the storage unit 102 scores therein, in addition to the element definition information described above, a design specification of each of a plurality of existing plants in association with an evidence document related to the existing plant. FIG. 7 is a diagram illustrating an example of the design specifications. In the example of FIG. 7, the design specifications are shown in a table form that indicate an element value of each of a plurality of elements for each of a plurality of existing plant names (A, B, and C). In the example of FIG. 7, output, fuel, heat resistant temperature, turbine method, turbine configuration, condenser vacuum degree, piping, CV (Control Valve) outer diameter, and MSV (Main Stop Valve) are written as the plurality of elements (element items), and element values respectively corresponding to the elements are written. The elements written in the design specifications illustrated in FIG. 7 are an example of a design specification related to a turbine of a thermal power station, and elements are not limited to these elements.

Figure 8:
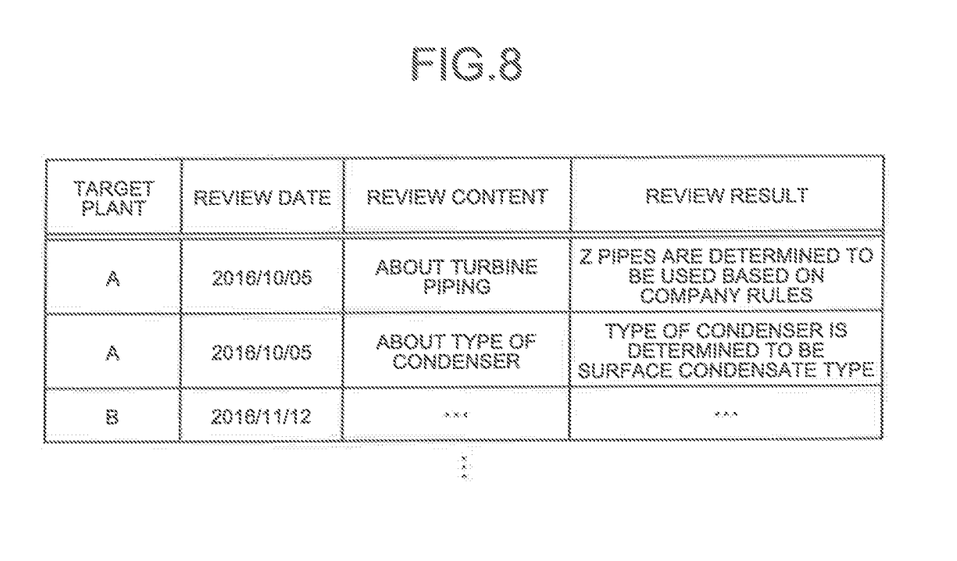
FIG. 8 is a diagram illustrating review meeting records of the first embodiment.
Figure 9:
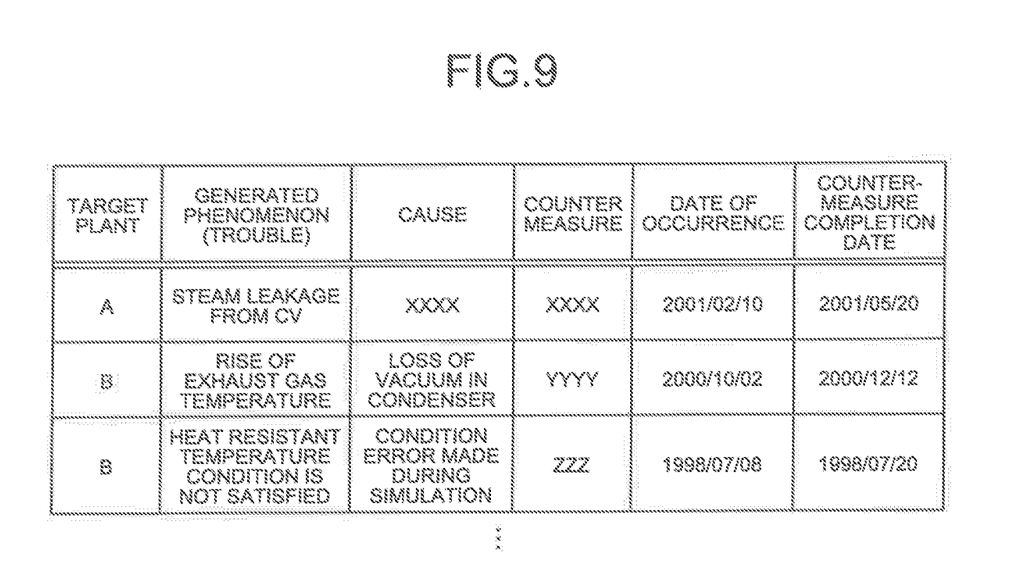
FIG. 9 is a diagram illustrating unsuitable case examples of the first embodiment.

FIG. 8 is a diagram illustrating an example of review meeting records. In the example of FIG. 8, the review meeting record is information in which target plant, review date, review content, and review result are associated with each other. FIG. 9 is a diagram illustrating an example of unsuitable case examples. In the example of FIG. 9, the unsuitable case example is information in which target plant, generated phenomenon (trouble), cause, countermeasure, date of occurrence, and countermeasure completion date are associated with each other.

Returning to FIG. 4 to continue the description, the second identification unit 104 identifies design specification of an existing plant similar to the required specification based on the element identified by the first identification unit 103. More specifically the second identification unit 104 identifies a design specification including an element that satisfies a condition indicated by an element value in the required specification of the element identified by the first identification unit 103 from among the design specifications of the existing plants stored in the storage unit 102. Here, it is assumed that the first identification unit 103 identifies the element "output" and the element "turbine meshed" which are associated with the condition "turbine" in the element definition information and that the storage unit 102 stores the design specifications illustrated in FIG. 7. In this case, the condition indicated by the element value in the required specification of the element "output" identified by the first identification unit 103 is c"400,000 kW or more" and the condition indicated by the element value in the required specification of the element "turbine method" identified by the first identification unit 103 is "steam", so that the second identification unit 104 identifies the design specifications of the plant name "A" and the plant name "B" which satisfy the above conditions from among the design specifications illustrated in FIG. 7.

The element selection unit 105 selects at least one element. For example, the element selection unit 105 can select an element identified by the first identification unit 103. Further, for example, the element selection unit 105 can select an element that indicates an element value different from element values in the design specifications identified by the second identification unit 104 from among the elements included in the required specification. For example, the element selection unit 105 may select an element that indicates an element value different from element values in the design specifications identified by the second identification unit 104 from among the elements identified by the first identification unit 103.

Here, as an example, it is assumed that the element selection unit 105 selects an element which indicates an element value different from element values in the design specifications identified by the second identification unit 104, from among the elements included in the required specification. For example, it is assumed that the acquisition unit 101 acquires the required specification illustrated in FIG. 5 and that the second identification unit 104 identifies the design specifications of the plant name "A" and the plant name "B" illustrated in FIG. 7. In this case, while the element value corresponding to the element "output" in the required specification is "400,000 kW or more", the element value corresponding to the element "output" in the design specification of the plant A is "600,000 kW" and the element value corresponding to the element "output" in the design specification of the plant B is "500,000 kW", Regarding the heat resistant temperature, in the same manner, the element value in she required specification is different from the element values in the design specifications. Therefore, in this case, the element "output" and the element "heat resistant temperature" are selected from among the elements in the required specification.

Alternatively, the element selection unit 105 may select elements whose element values are written in the design specifications of the existing plants identified by the second identification unit 104 but whose element valves are not specified in the required specification (turbine configuration, condenser vacuum degree, piping, CV outer diameter, and MSV in the examples of FIGS. 5 and 7) as the elements.

The extraction unit 106 extracts descriptions related to the elements selected, by the element selection unit 105, from evidence documents associated with the design specifications identified by the second identification unit 104 among a plurality of evidence documents stored in the storage unit 102. For example, it is assumed that the second identification unit 104 identifies the design specifications of the plant name "A" and the plant name "B" and that the element selection unit 105 selects the element "output" and the element "heat resistant temperature". In this case, the extraction unit 106 extracts a description related to the element "output" and a description related the element "heat resistant temperature" from among an evidence document associated with the design specification of the plant name "A" and an evidence document associated with the design specification of the plant name "B". For example, it is possible to extract a description including a keyword ("kW" or the like) corresponding to the "output" and a description including a keyword ("boiler" or the like) corresponding to the "heat resistant temperature" from the evidence documents.

The output unit 107 outputs an extraction result extracted by the extraction unit 106. Although an output form is not limited, typically it is assumed that an image is outputted.

Figure 10:
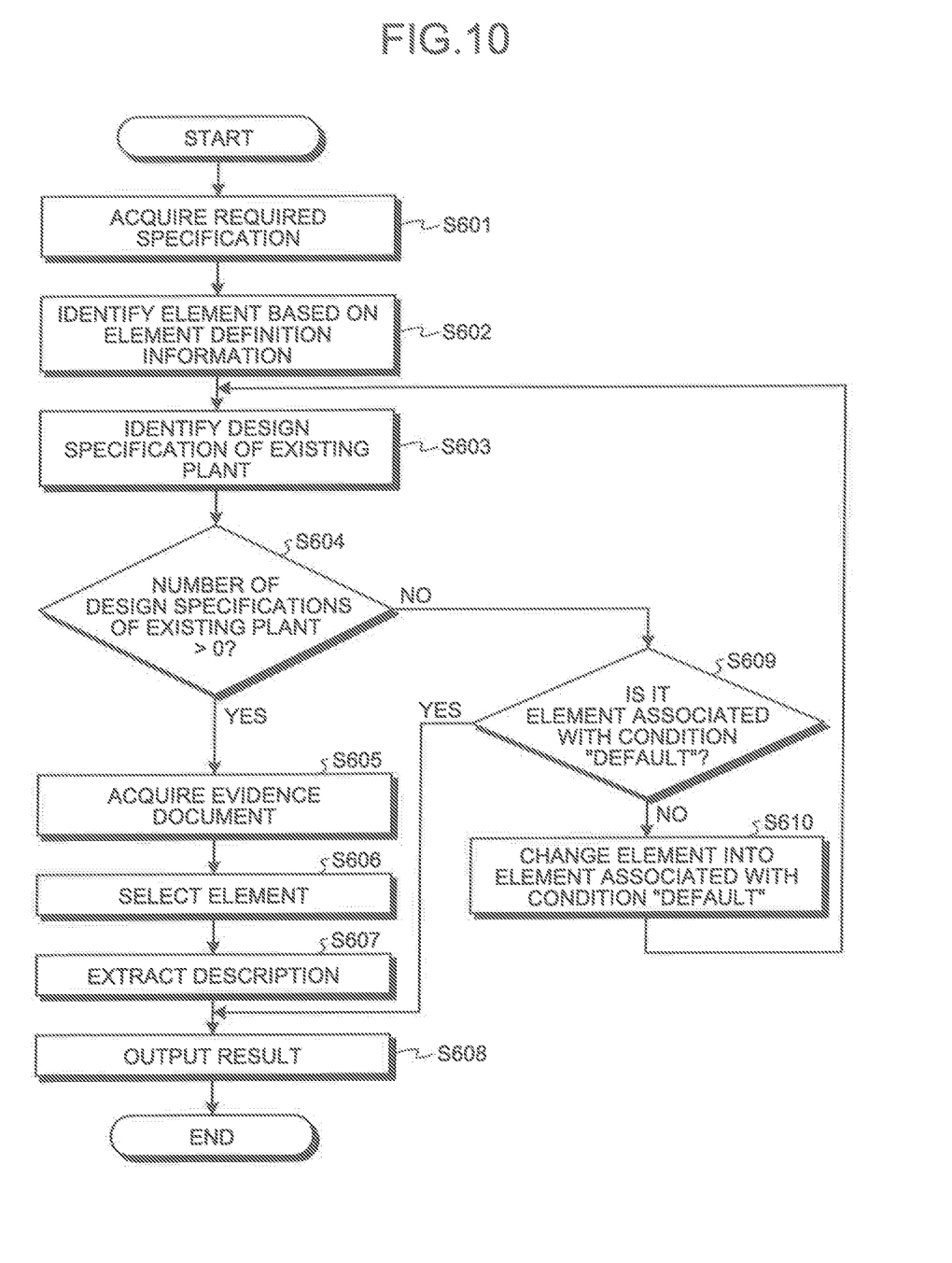
FIG. 10 is a flowchart illustrating an operation example of the design support system of the first embodiment.

FIG. 10 is a flowchart illustrating an operation example of the design support system 1 of the present embodiment. The specific content of each step is basically the same as described above, so that description will be appropriately omitted. As illustrated in FIG. 10, first, the acquisition unit 101 acquires a required specification (step S601). Next, the first identification unit 103 identifies an element associated with a condition that matches the required specification acquired in step S601 based on the element definition information (step S602). Next, the second identification unit 104 identifies a design specification of an existing plant similar to the required specification acquired in step S601 based on the element identified in step S602 (step S603).

When the number of design specifications of an existing plant(s) identified in step S603 is zero (step S604: No), the second identification unit 104 checks whether or not the element (comparison element) that has been used to identify the design specification of an existing plant is an element associated with the condition "default" in the element definition information (step S609). When the result of step S609 is negative (step S609: No), the second identification unit 104 changes the comparison element into an element associated wish the condition "default" in the element definition information (step S610) and performs processing of step S603 described above. When the result of step S603 is affirmative (step S609: Yes), the operation proceeds to seep S608 described later and, for example, the output unit 107 outputs a message indicating that design specification of an existing plant similar to the plant to be designed is not found.

When the number of design specifications of an existing plant(s) identified in step S603 is greater than zero (step S604: Yes), the extraction unit 106 acquires an evidence document associated with the design specification identified in step S603 from the storage unit 102 (step S605). Next the element selection unit 105 selects an element that indicates an element value different from element values in the design specification identified in step S603 from among elements included in the required specification acquired in step S601 (step S606). Next, the extraction unit 106 extracts a description related to the element selected in step S606 from the evidence document acquired in step S605 (step S607). Then, the output unit 107 outputs the resale of step S607 (step S608).

As described above, in the present embodiment, a comparison element associated with a condition that matches the required specification is identified based on the element definition information in which one or more elements are associated with each of a plurality of conditions, and a design specification of an existing plant similar to the required specification is identified based on the comparison element. Then, an element that indicates an element value different from element values in the similar design specification of an existing plant from among elements included in the required specification is extracted and a description related to the selected element is extracted from an evidence document associated with the similar design specification of an existing plant. Thereby, it is possible to accurately extract an existing plant similar to the plant to be designed (new plant) and to extract information that should be known by the designer in advance from document information related to the extracted existing plant.

Second Embodiment

Figure 11:
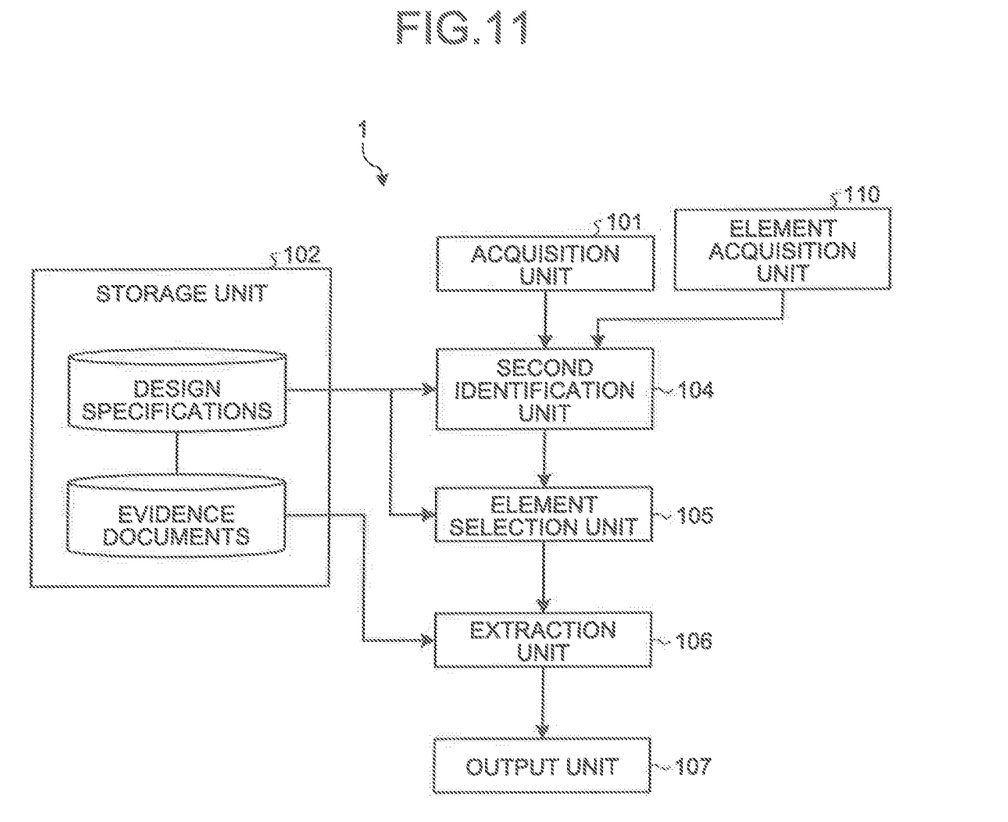
FIG. 11 is a diagram illustrating functions of a design support system of a second embodiment.
Figure 12:
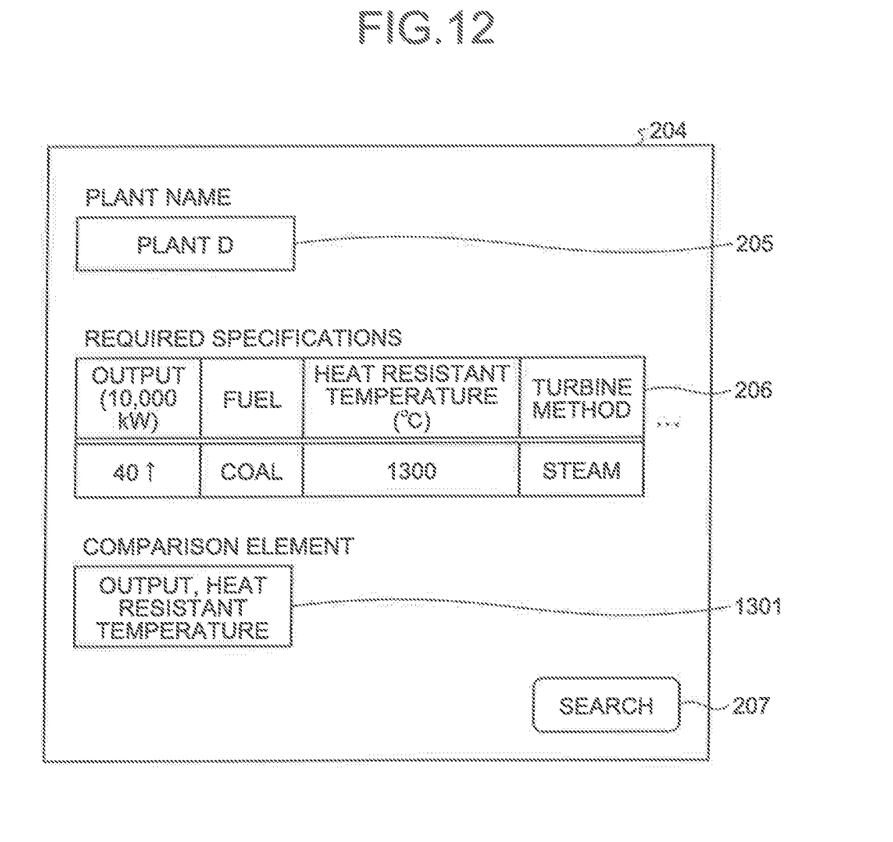
FIG. 12 is a diagram illustrating an input interface screen of the second embodiment.

Next, a second embodiment will be described. The description of the same components as those in the first embodiment described above will be appropriately omitted. FIG. 11 is a diagram illustrating an example of functions of a design support system 1 of the second embodiment. The example illustrated in FIG. 11 is different from the first embodiment describe above in that the element definition information and the first identification unit 103 are not provided, but an element acquisition unit 110 is provided. The element acquisition unit 110 has a function to acquire an element expressly specified by a user. In other words, the element acquisition unit 110 has a function to acquire a comparison element. FIG. 12 is a diagram illustrating an example of an input interface screen where the user specifies an element. In the example illustrated in FIG. 12, an area 1301 used for inputting a comparison element is added to an aspect illustrated in FIG. 2.

Third Embodiment

Figure 13:
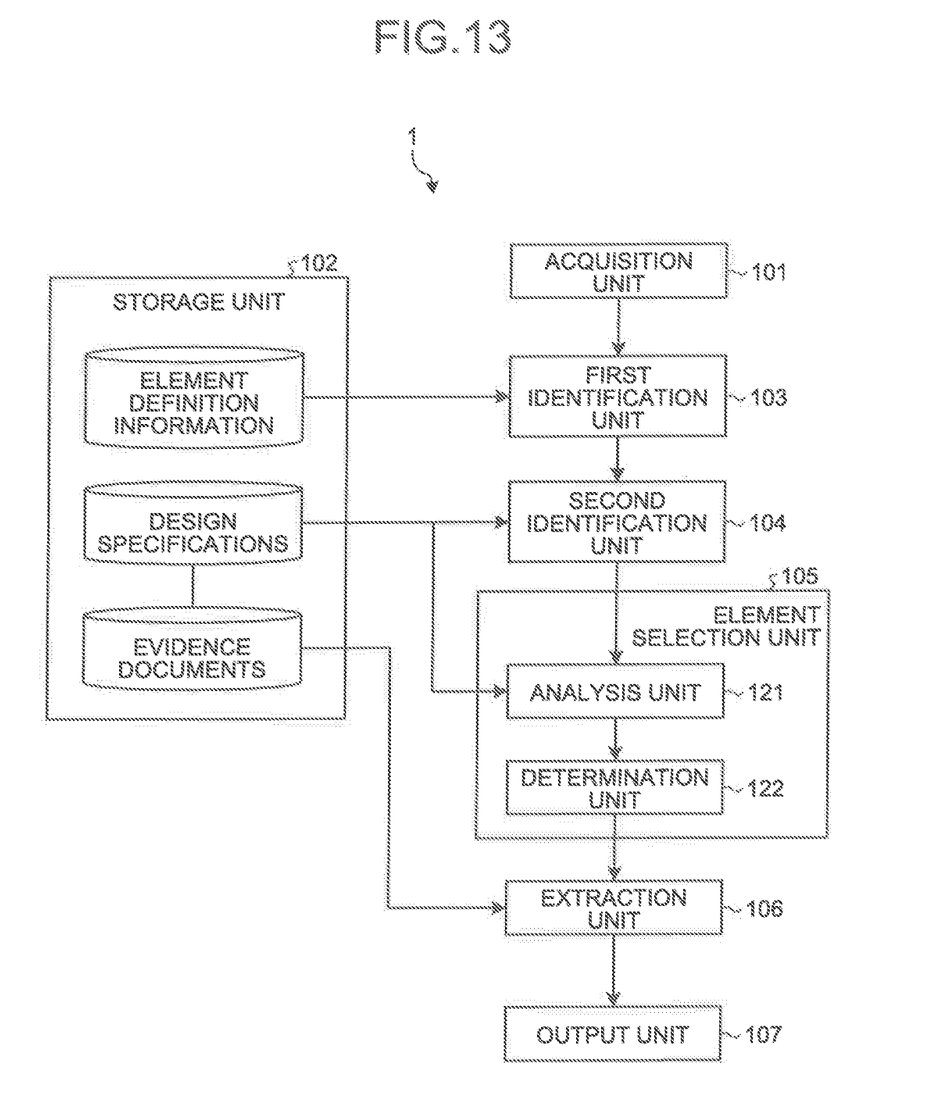
FIG. 13 is a diagram illustrating functions of a design support system of a third embodiment.

Next, a third embodiment will be described. The description of the same components as those in the first embodiment described above will be appropriately omitted. FIG. 13 is a diagram illustrating an example of functions of a design support system 1 of the third embodiment. As illustrated in FIG. 13, the element selection unit 105 is different from that of the first embodiment in that an analysis unit 121 and a determination unit 122 are included. The analysis unit 121 calculates a distribution of element values for each element included in the design specification identified by the second identification unit 104. The determination unit 122 calculates a distance between an element value corresponding to an element in the required specification and a distribution of element values corresponding to the element analyzed by the analysis unit 121 for each element included in the required specification, and selects an element whose distance is greater than or equal to a threshold value. The selection result of the determination unit 122 becomes a selection result of the element selection unit 105.

Figure 14:
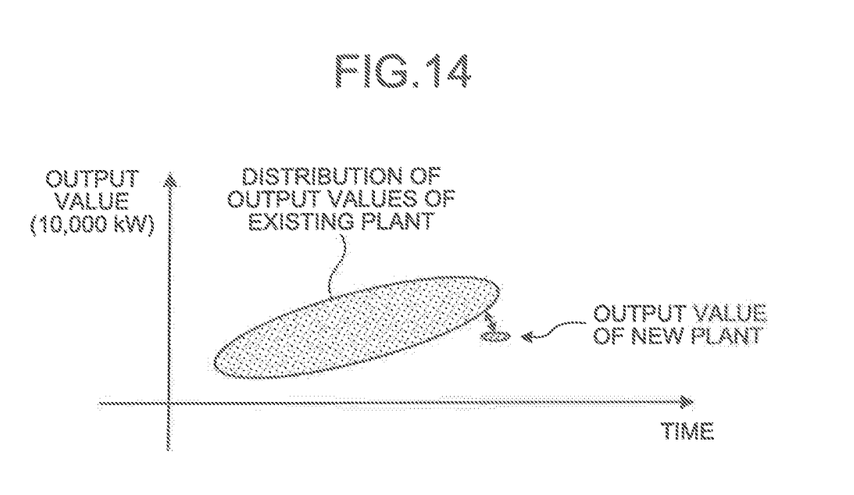
FIG. 14 is a diagram illustrating an example of a distribution of element values of the third embodiment.

FIG. 14 is a diagram illustrating an example of a distribution of element values corresponding to an element "output" included in each of a plurality of design specifications similar to the required specification. In the example of FIG. 14, the vertical axis represents element value corresponding to the element "output", the horizontal axis represents design time of a corresponding existing plant, and a distribution of element values (output values) corresponding to the element "output" in the design specification of each existing plant is plotted. Thereby, a time-series change of output values can be detected and it is possible to determine whether or not the required specification of the new plant is in accordance with design trends. The determination unit 122 calculates a distance between an element value corresponding to an element in the required specification and a distribution of element values corresponding to the element analyzed by the analysis unit 121 for each element included in the required specification, and when the calculated distance exceeds a predetermined threshold value, the determination unit 122 selects the element as an element used by the extraction unit 106.

The distance described above can be defined as a minimum value of a distance between an element value in the required specification and each element value in each existing plant. For example, when an identifier (1 to N) is provided to each of N pieces of design specifications identified by the second identification unit 104 and a set of element values corresponding to one of elements analyzed by the analysis unit 121 is defined as $D=(d_1, \ldots, d_N)$, each element value $d_j (j=1, \ldots, N)$ can be represented, as a point $(x_j, y_j)$ on coordinates where the horizontal axis (X axis) is design time and the vertical axis (Y axis) is element value. Further, an element value t in the required specification can also be represented as a point (xt, yt) on coordinates in the same manner. At this time, a distance between t and an element value $d_j (j=1, \ldots, N)$ can be a minimum value $\min_{dj \in N} |t-dj|$ of a linear distance between the coordinates of element value in the required specification and the coordinates of the element value $d_j (j=1, \ldots, N)$.

The element determined by the determination unit 122 corresponds to the element selected by the element selection unit 105. All elements whose values are not expressly written in the required specification may be selected. When employing such configuration, it is possible to further support a user who determines a design specification of a new plant by presenting not only the descriptions extracted by the extraction unit 106 but also processing results of the analysis unit 121 and the determination unit 122 (latest design results of each element of the design specification and information indicating that conditions of the required specification deviate from a latest trend of plant design).

In the embodiments described above, a power generation plant is described, taking it as an example of a plant. However, a plant to which the embodiments are applied is not limited to the power generation plant, and the embodiments can be applied to, for example, a water treatment facility such as a water purification facility and an industrial water recycling facility, and a chemical plant facility. In the case of the water treatment facility, elements constituting the water treatment facility include a filter device, a treatment pump, piping, a water storage tank, a water supply amount, and the like. Configurations of the embodiments described above are applicable to the facilities described above. It is possible to accurately extract an existing plant similar to the plant to be designed (new plant) and to extract information that should be known by the designer in advance from document information related to the extracted existing plant. The "plant" means a facility consisting of a plurality of devices necessary to produce a product or the like.

Figure 15:
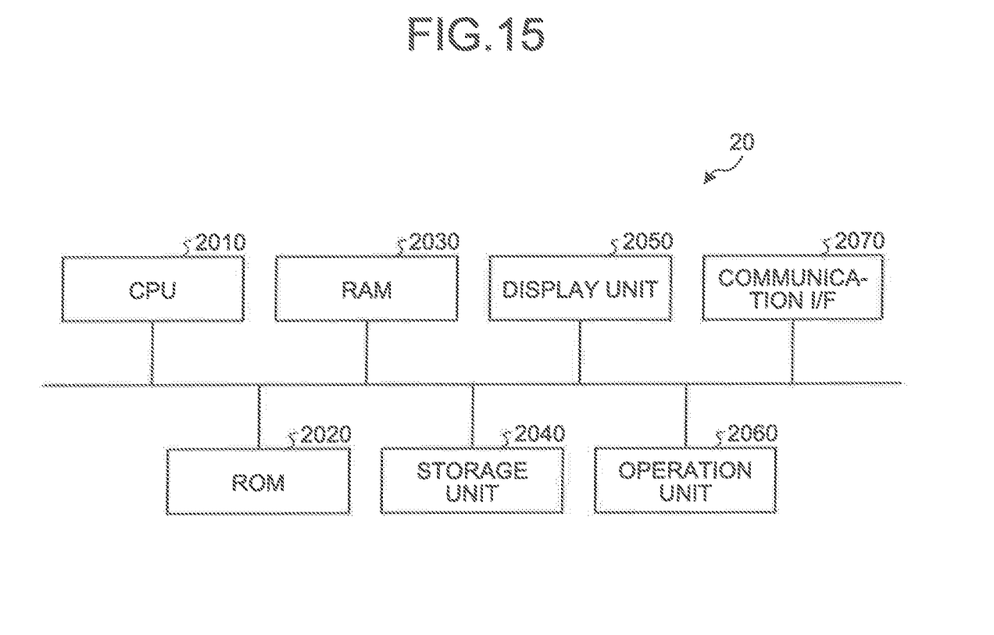
FIG. 15 is a diagram illustrating a hardware configuration of a terminal of the embodiments.

FIG. 15 is a diagram illustrating an example of a hardware configuration of the terminal 20 of each embodiment described above. The server 10 may have the same configuration. As illustrated in FIG. 15, the terminal 20 includes a GPU 2010 a ROM 2020, a RAM 2030, a storage unit 2040, a display unit 2050, an operation unit 2060 and a communication I/F 2070.

The CPU 2010 integrally controls operation of the terminal 20. The CPU 201 causes various functions of the terminal 20 to be implemented by executing various control programs recorded in the ROM 2020 by using a predetermined area of the RAM 2030 as a work area. In this example, the CPU 2010 can implement functions other than those of the storage unit 102 described above by executing a web application provided from the server 10.

The ROM 2020 is a non-volatile memory (unrewritable memory) that stores therein programs and various setting information related to the terminal 20.

The RAM 2030 is a storage unit such as, for example, an SDRAM. The RAM 2030 functions as a work area of the CPU 2010 and plays a role of a buffer and the like.

The storage unit 2040 has a storage medium that can magnetically or optically store therein data and plays a role of an auxiliary storage device that records various setting information, processing results, and the like.

The display unit 2050 is a device that displays various information related to the design support system 1. For example, the display unit 2050 is formed of a liquid crystal display or the like.

The operation unit 2060 is a device for receiving an operation of a user. The display unit 2050 and the operation unit 2060 may be integrally configured (for example, configured as a touch panel).

The communication I/F 2070 is an interface for connecting to the network 30.

In each embodiment described above, a program for providing the design support function described above is provided as a web application. However, the program for providing the design support function described above may be provided by installing the program into a non-volatile recording medium such as a ROM in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. A design support system that supports determination of a first design specification of a plant, the plant including a plurality of components, the first design specification including a plurality of elements and first values respectively corresponding to the elements, the elements being used for designing the plant, and the system comprising:

a memory configured to store therein a plurality of second design specifications respectively corresponding to a plurality of existing plants and first information in association with the existing plants, the first information including at least one of a review meeting record and an unsuitable case example of the existing plants, the review meeting record showing review contents and review results of a past design of the existing plants, and the unsuitable case example showing a cause and a countermeasure for each trouble in the existing plants; and a hardware processor electrically coupled to the memory, and configured to:

acquire a required specification which includes at least one of the plurality of elements included in a design of the plant and a second value of the at least one element to be satisfied in the design of the plant;

identify, based on second information including one or more elements associated with each of the components of the plant, an element, among the one or more elements in the second information that is associated with a component of the plant and matches the required specification;

identify, among the second design specifications of the existing plants, a second design specification of an existing plant based on the element identified, the identified second design specification including elements and values respectively corresponding to the elements, the elements of the second design specification including the at least one element of the required specification;
select at least one element from among the elements of the required specification;
extract, from the first information associated with the second design specification identified, a description related to the at least one element selected; and
output the description to support the determination of the first design specification.

2. The system according to claim 1, wherein the hardware processor identifies a second design specification including an element that satisfies a condition indicated by a second value in the required specification of the element identified, from among the second design specifications stored in the memory.

3. The system according to claim 1, wherein the hardware processor selects the element identified.

4. The system according to claim 1, wherein the hardware processor selects an element that indicates a second value different from a first value in the second design specification identified, from among elements included in the required specification.

5. The system according to claim 1, wherein the hardware processor selects an element whose first value is written in the second design specification identified but whose second value is not specified in the required specification.

6. The system according to claim 4, wherein the selecting by the hardware processor includes
calculating, for each element included in the second design specification identified, a distribution of first values, and
calculating, for each element included in the required specification, a distance between a second value corresponding to an element in the required specification and a distribution of first values corresponding to the element calculated, and selecting an element whose distance is greater than or equal to a threshold value.

7. A design support method performed by a design support system that supports determination of a first design specification of a plant, the plant including a plurality of components, the first design specification including a plurality of elements and first values respectively corresponding to the elements, and the elements being used for designing the plant, the system including a memory configured to store therein a plurality of second design specifications respectively corresponding to a plurality of existing plants and first information in association with the existing plants, the first information including at least one of a review meeting record and an unsuitable case example of the existing plants, the review meeting record showing review contents and review results of a past design of the existing plants, and the unsuitable case example showing a cause and a countermeasure for each trouble in the existing plants,
the method comprising:
acquiring a required specification which includes at least one of the plurality of elements included in a design of the plant and a second value of the at least one element to be satisfied in the design of the plant;
identifying, based on second information including one or more elements associated with each of the components of the plant, an element, among the one or more elements in the second information, that is associated with a component of the plant and matches the required specification;
identifying, among the second design specifications of the existing plants, a second design specification of an existing plant based on the element identified, the identified second design specification including elements and values respectively corresponding to the elements, the elements of the second design specification including the at least one element of the required specification;
selecting at least one element from among the elements of the required specification;
extracting, from the first information associated with the second design specification identified, a description related to the at least one element selected; and
output the description to support the determination of the first design specification.

8. The design support method according to claim 7, further comprising:
displaying, on a display device, an interface screen that allows a user to input information representing the required specification, and
acquiring, as the required specification, information input by the user through the interface screen.

9. The design support system according to claim 1, further comprising one or more interface devices configured to display a screen and receive an input operation of a user to the displayed screen,
wherein the hardware processor is configured to:
display, on the one or more interface devices, an interface screen that allows a user to input information representing the required specification, and
acquire, as the required specification, information received by the one or more interface devices through the interface screen.

* * * * *